May 24, 1960　　F. M. KACZMAREK　　2,937,727
ROTATABLE FENCE POST
Filed May 5, 1958

INVENTOR.
Frank M. Kaczmarek
BY Scott L. Norvell
atty.

United States Patent Office 2,937,727
Patented May 24, 1960

2,937,727

ROTATABLE FENCE POST

Frank M. Kaczmarek, 2503 N. 16th St., Apt. D, Phoenix, Ariz.

Filed May 5, 1958, Ser. No. 732,929

2 Claims. (Cl. 189—23)

This invention concerns an improved clean fence line post of the rotatable type.

One of the objects of the invention is to provide a fence post having a vertical top part to hold fence wires in spaced position, and an offset crank part therebelow, and a vertical bottom or stake part for insertion into the earth to hold the post in position;

Another object is to provide a fence post having a vertical top part, to hold fence wires, and a vertical bottom or stake part for rotatably supporting the post in the ground and having an augur bottom end to assist in inserting the post into the ground, and a crank part positioned between said two vertical parts to aid in supporting the post and to provide an offset crank pin part and a bottom crank throw arm resting on the ground;

Still another object is to provide a fence post having a vertical part adapted to hold fence wires on journalled sleeves, a bottom stake part adapted for insertion into the ground on the fence line and a rotatable crank part including a substantially horizontal crank throw bottom arm connecting to an offset crank pin and a second stake part removably attached to said crank pin part to aid in supporting said crank part and preventing its rotation when desired.

Other objects will appear hereinafter.

I attain the foregoing objects by means of the devices, parts and combinations of parts shown in the accompanying drawing in which—

Similar numerals refer to similar parts in the several views.

Figure 1:
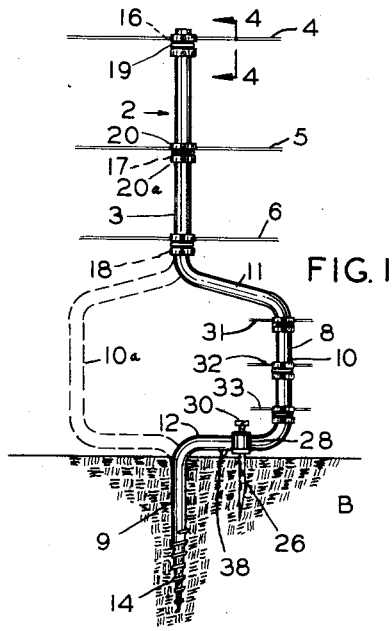
Figure 1 is a side elevational view of a fence post incorporating my improvements.

The post 2 is divided into three parts, namely, a top vertical part 3 which is adapted to hold fence wires 4, 5 and 6, an offset crank part 8, and a vertical bottom or stake part 9 which is aligned axially with top part 3.

The offset portion 8 has a vertical crank pin portion 10 joined at each end to crank throw bars marked 11 at the top and 12 at the bottom. These bars are substantially horizontal and the lower bar 12 rests on the ground at ground level. This crank part may be rotated and swung to the opposite position shown in dotted lines 10a.

An augur 14 is on the lower end part of the stake part 9.

Fence wires 4, 5 and 6 are held on insulator spools 16, 17 and 18, respectively. These spools are held in position on the upper post part 3 by eye bolts 19 having threaded shanks 19a which are inserted through the spools. The eye 15 of each bolt 19 is slipped over the post and is journalled on it. The eyes are held in position on the post by collars 20 and 20a, above and below the bolt eye, respectively. The collars are fixed in place by set screws 21. The wires are held in annular grooves 22 of each spool and secured to the spool by tie wires 23.

It is to be understood that the crank portion 10 may be rotated as a crank using the lower portion 9 of the post as a bearing shaft and center of rotation. This crank portion may be held in position by a removable stake 26. The stake is removably attached to the horizontal arm 12 of the crank by collar 28. It may be pried up from its set position, shown in Figure 1, by using any ordinary prying tool engaging the outwardly extending lug 30.

Figure 3:
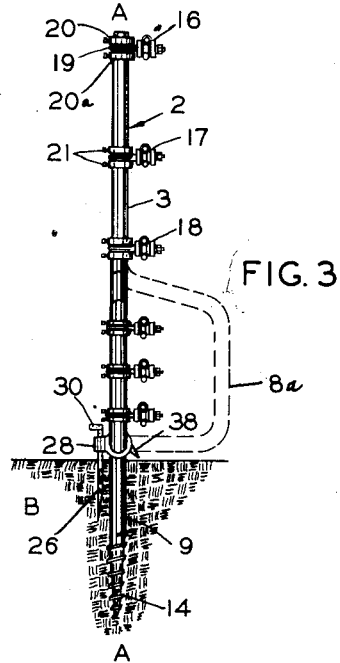
Figure 3 is a view of the post taken along the fence line.
Figure 4:
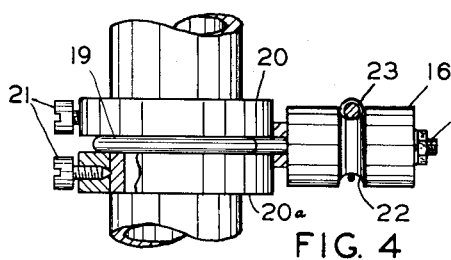
Figure 4 is a fragment of the upper part of the fence post drawn on an enlarged scale and showing the rotative fence wire attaching means.
Figure 2:
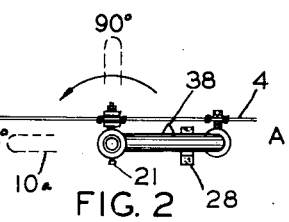
Figure 2 is a plan view thereof.
Figure 5:
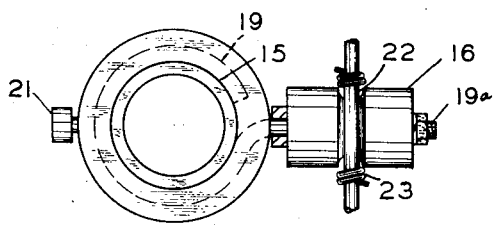
Figure 5 is a plan view thereof showing means for attaching fence wires.

In use the stake is set on the fence line, indicated by A—A Figure 2. The offset may be positioned in the same plane as the fence line A—A, as shown in Figure 1, or it may be offset by rotating the crank 90 degrees or 180 degrees as shown in Figure 2. After rotation of the crank 10 to the position desired, it is staked in place by the auxiliary stake 26. When it is desired to mow grass or other plants growing on the ground B on or near the fence line the crank is turned 90 degrees to one side of the fence line A—A, as shown by dotted lines 8a Figure 3, and the mower is then run over the grass on the fence line. In this operation the mower passes over the lower arm 12 of the post as it rests on the ground. This first cutting may be made from the left side of the fence as viewed in Figure 3 and the mower blade or knives passed up to and beyond the center line A—A. If desired a second mowing cut may be made from the right hand side of the fence as viewed in Figure 3 by rotating the crank 8 to the left side of the fence line. This cut may also extend to and even beyond the center line A—A of the fence as viewed in Figure 3.

It is to be noted that the upper part 3 of the post 2 rotates when the crank 8 is rotated. The wires 4, 5, and 6 are not disturbed by this rotation but maintain their position on spools 16, 17, and 18 which are supported on the eye bolts 19 on the post portion 3. The positioning or locking collars 20 and 20a rotate with the post.

From the foregoing it will be understood that I have provided a fence post which may be readily set in position on a fence line to enclose or divide a portion of land. The curved portion of the post, that is, the crank portion 8 may be rotated as desired so that grass or the like may be mowed from either side of the fence line, as above described. Where the fence is intended to confine only large animals the structure above described is entirely adequate.

However, if small animals are to be confined, the lower wires indicated by numerals 31, 32 and 33 may be provided and attached to the crank pin portion 10 of each post used and held in position by rotatable attaching means which is the same as that used for wires 4, 5 and 6, so that these lower wires will stay in position as the crank pin 10 rotates. Thus, when the post is rotated the lower portion of the fence, including the wires 31, 32, and 33, is offset relative to the fence line. After mowing, this lower portion of the fence is again aligned with the top wires 4, 5 and 6 by returning the crank 10 to a position, as shown in Figure 1. Thus, when desired, the whole lower portion of the fence may be offset to one side or the other along with the cranks 8 of the several posts of the fence.

Movement of the offset portion is indicated by numeral 8a.

Whereas, as above stated, small animals may be confined by three lower wires 31, 32 and 33 it is also possible to equip the fence with wire screen (not shown). In doing this the top of the wire screen is hooked in any desired manner to the top of each post 2. The lower edge of the wire screen may then be hooked over downwardly extending spur points or hooks 38 on bar 12 of each post.

When necessary to rotate the post in order to mow on the fence line the screen fence wires may be unhooked from spurs 38, lifted and temporarily attached to the top portion of each post.

I claim:

1. A clean row rotatable fence post having a top vertical part, a vertical bottom stake part aligned with said upper part having a threaded augur point at the bottom end an an offset crank part having a vertical crank pin portion and upper and lower substantially horizontal crank throw bars joining the vertical crank pin portion and the upper and lower vertical post parts, respectively; the lower crank throw bar being adapted to lie flat on the ground when the bottom stake part is driven into the ground and the post is in a position to support fence wires, and a plurality of fence wire supporters and attaching devices journalled on the vertical portions of said post.

2. A fence post as described in claim 1 in combination with a stake attached to the lower crank throw bar and adapted to be inserted into the ground to prevent rotary movement of the fence post.

References Cited in the file of this patent

UNITED STATES PATENTS

| | | |
|---|---|---|
| 650,627 | Anderson | May 29, 1900 |
| 2,610,224 | Norris | Sept. 9, 1952 |
| 2,734,727 | Hensley | Feb. 14, 1956 |